United States Patent
Mead et al.

(10) Patent No.: US 10,470,381 B1
(45) Date of Patent: Nov. 12, 2019

(54) FELLING GRAPPLE FOR REMOVING ENERGIZED VEGETATION MATERIAL

(71) Applicant: Altec Industries, Inc., Birmingham, AL (US)

(72) Inventors: David Mead, Raleigh, NC (US); Eric Joseph Lumberg, Maple, WI (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 16/263,686

(22) Filed: Jan. 31, 2019

(51) Int. Cl.
*A01G 23/091* (2006.01)
*A01G 23/093* (2006.01)
*B66C 3/18* (2006.01)
*B60P 3/41* (2006.01)
*B66C 1/68* (2006.01)
*B66C 1/58* (2006.01)

(52) U.S. Cl.
CPC ......... *A01G 23/091* (2013.01); *A01G 23/093* (2013.01); *B60P 3/41* (2013.01); *B66C 1/58* (2013.01); *B66C 1/68* (2013.01); *B66C 3/18* (2013.01)

(58) Field of Classification Search
CPC .... A01G 23/08; A01G 23/081; A01G 23/083; A01G 23/091; A01G 23/093; A01G 23/095
See application file for complete search history.

(56) References Cited

U.S. PATENT DOCUMENTS

| | | | | | |
|---|---|---|---|---|---|
| 4,269,241 | A | * | 5/1981 | Hickman | A01G 3/08 144/24.13 |
| 6,408,906 | B1 | * | 6/2002 | Moon | A01G 3/08 144/24.13 |
| 9,301,458 | B2 | * | 4/2016 | Terrell | A01G 23/095 |
| 2018/0317397 | A1 | * | 11/2018 | Carter | B25J 15/0033 |

* cited by examiner

*Primary Examiner* — Matthew Katcoff
(74) *Attorney, Agent, or Firm* — Erise IP, P.A.

(57) ABSTRACT

An insulating felling grapple is used with an insulating utility vehicle. The utility worker stands on the ground near the worksite and remotely controls the insulating felling grapple and the utility vehicle to perform the task. In addition to other standard trimming and removal tasks, the insulating felling grapple is adapted to allow for the removal of energized vegetation material. In one method, the utility worker grasps the energized vegetation material, lifts or moves the energized vegetation material such that it is no longer energized, severs the non-energized vegetation material, and moves the severed vegetation material to a discard location. A boom assembly of the utility vehicle includes a primary insulation segment. The felling grapple includes a secondary insulation segment, as well as a grapple and a feller. The grapple has at least two tines for gripping the energized material. The feller is configured to sever the energized or nonenergized material.

18 Claims, 9 Drawing Sheets

FELLING GRAPPLE FOR REMOVING ENERGIZED VEGETATION MATERIAL

RELATED APPLICATIONS

Embodiments and/or features of the invention described in the present document may be used with the subject matter disclosed in simultaneously filed U.S. Non-Provisional patent application Ser. No. 16/263,773, filed Jan. 31, 2019, and entitled "GRAPPLE CONTROL SYSTEM." The simultaneously filed application is hereby incorporated by reference in its entirety into the present application.

Embodiments and/or features of the invention described in the present document may be used with subject matter disclosed in commonly assigned U.S. U.S. Pat. No. 9,751,734, issued Sep. 5, 2017, and entitled "GRAPPLER OVERLOAD PROTECTION." The identified earlier-filed patent is hereby incorporated by reference in its entirety into the present application.

Embodiments and/or features of the invention described in the present document may be used with subject matter disclosed in commonly assigned previously filed U.S. patent application Ser. No. 16/053,219, issued Aug. 2, 2018, and entitled "A SYSTEM AND METHOD FOR DETECTING A CONTACT BETWEEN AN AERIAL DEVICE AND AN ELECTRICAL POWER SOURCE." The identified earlier-filed patent application is hereby incorporated by reference in its entirety into the present application.

BACKGROUND

1. Field

Embodiments of this invention relate to felling grapples. More specifically, embodiments of the invention relate to systems and methods for removing energized vegetation using a felling grapple.

2. Related Art

Typical felling grapple systems provide a grapple and feller for gripping and cutting tree limbs. The gripping and cutting of the tree limbs, or other vegetation, may be for any of numerous purposes. For example, a common application is to remove or trim the tree limbs around electrical power lines, communication lines, and other electrified sources. This removal and/or trimming is performed to prevent or reduce the likelihood that the tree limb will fall onto or grow into the electrified source. Contact between the tree limb and the electrified source can damage the electrified source and provide for electrical discharge through the vegetation.

Despite preventative trimming (such as via a standard felling grapple), and in areas which lack preventative trimming, the vegetation can become energized upon contact with the hazardous object. While vegetation is normally a good insulator, wood (as specifically green or wet wood) can become energized through direct contact with a high-voltage source such as a power line. For example, a storm may buckle or weigh-down the tree branch such that the electrified source is contacted. In these situations, the wood is wet, green, and directly in contact with the power line. Thus, the vegetation must be removed from the electrified source, so as to prevent damage (or further damage) to the electrified source, prevent the loss of electric power through discharge, and prevent electrical discharge through a person or other animal.

In prior art systems, this function of removal is performed by a utility worker suspended in an insulated utility platform of an aerial device. The utility worker grasps an insulated pole saw and uses this tool to cut the vegetation. The utility worker cuts away small sections of the vegetation and allows the cut vegetation to fall. In many instances, this prior art system requires the cutting of electrical power to the electrified source and de-energizing the lines.

This prior art system is flawed for numerous reasons. First, the utility worker is disposed within a potential path of discharge. While there is both primary protection (in the insulated pole saw) and secondary protection (in the insulated boom assembly and/or utility platform), removing the utility worker from the area would reduce the likelihood of electrical discharge through the utility worker. Second, cutting the electrical power and de-energizing the lines can be very time- and resource-consuming, as well as inconvenient or harmful to people relying upon that electrical power. Third, the insulated pole saw provides limited cutting capacity as it must be of a size which can be wielded by hand. Fourth, the insulated pole saw provides no ability to grasp the severed vegetation. The freefalling vegetation may provide a danger to structures, people, and objects below.

SUMMARY

Embodiments of the invention solve the above-mentioned problems by providing an insulated felling grapple for removing energized vegetation material. The insulated felling grapple is used with an insulated utility vehicle. In embodiments of the invention, the utility worker stands on the ground near the worksite and remotely controls the insulated felling grapple and the utility vehicle to perform the task. In addition to other standard trimming and removal tasks, the insulated felling grapple is adapted to allow for the removal of energized vegetation material. In one method, the felling grapple grasps the energized vegetation material, lifts or moves the energized vegetation material such that it is no longer energized (or energized to a lesser extent), severs the non-energized vegetation material, and moves the severed vegetation material to a discard location.

A first embodiment is directed to a utility vehicle for removing energized material. The utility vehicle includes a boom assembly and a felling grapple. The boom assembly includes a primary insulation segment. The felling grapple includes a secondary insulation segment, as well as a felling grapple and a feller. The felling grapple has at least two arms for gripping the energized material. The feller is configured to sever the energized material. The felling grapple retains the energized material after severed by the feller such that the energized material may be manipulated.

A second embodiment is directed to a felling grapple configured to be secured to an insulated boom assembly of a utility vehicle, the felling grapple comprising a pivoting base, a grapple, and a feller. The grapple is secured to the pivoting base and includes an arm for gripping the energized material. The feller is secured to the pivoting base and configured to sever the energized material. The felling grapple retains the energized material after severed by the feller such that the energized material may be manipulated.

A third embodiment is directed to a method for removing vegetation material that is energized by contact with an electrified source comprising: manipulating an insulated boom assembly so as to move a felling grapple adjacent to the energized vegetation material; grasping the energized vegetation material by operating at least one arm of the felling grapple; moving the energized vegetation material out of contact with the electrified source, such that the vegetation material becomes non-energized; severing the non-energized vegetation material by operating a feller of the felling grapple; and moving the severed and non-energized vegetation material by manipulating at least one of the insulated boom assembly and the felling grapple.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

BRIEF DESCRIPTION OF THE DRAWING FIGURES

Embodiments of this disclosure are described in detail below with reference to the attached drawing figures, wherein.

Figure 1:
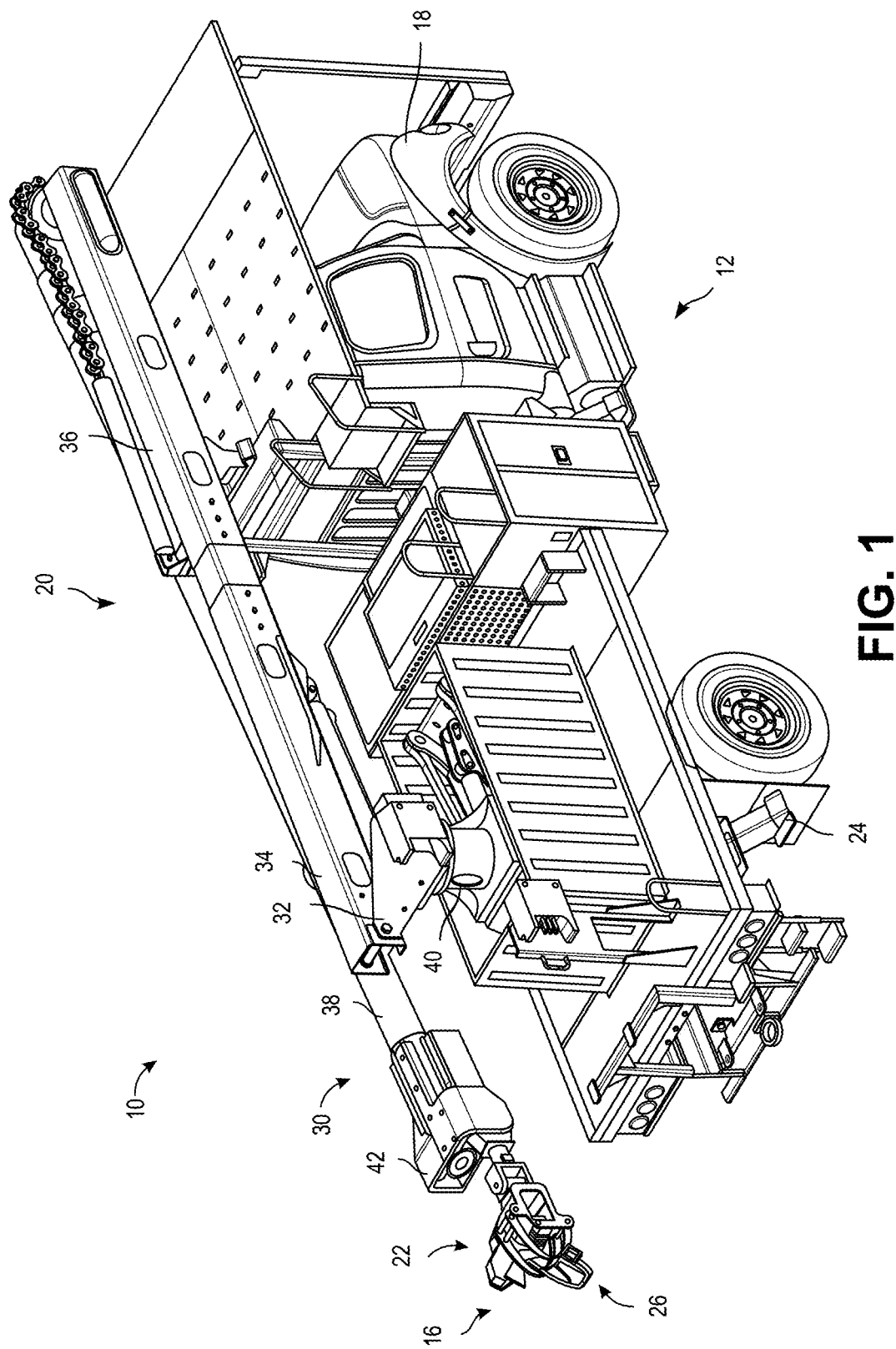
FIG. 1 depicts a perspective view of an embodiments of an insulating aerial device with a grapple.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

An aerial device 10, depicted in FIG. 1, presents an exemplary embodiment for practicing the invention. The aerial device 10 generally includes a base 12 that supports an extendable member configured to position a tool 16. In an embodiment, a utility truck 18 provides the base 12; a boom assembly 20 serves as the extendable member; and a felling grapple 22 serves as the tool 16. The base 12 provides a stable support, which may include outriggers 24, for supporting a load applied to the boom assembly 20 and/or the felling grapple 22. The felling grapple 22 may rotate in multiple directions (axis) to alter its orientation for grabbing objects (e.g., a tree limb oriented horizontally or vertically). In some embodiments, the felling grapple 22 comprises grapple 26 for gripping the objects and a cutting device 27 such as, for example, a saw or shears for cutting the objects.

In certain embodiments, the base 12 is the utility truck 18, but may be a crane base, an oilrig, an earth-working machine, or a fixed structure. In certain embodiments, the aerial device 10 is used to access elevated objects or otherwise difficult to reach items. For example, the aerial device 10 may include the boom assembly 20 that is rotatable and extendable. The boom assembly 20 is used to extend the reach of the tool for accessing difficult to reach locations. The base 12 is mechanically coupled to a proximal end 28 of the boom assembly 20 and the tool 16 is mechanically coupled to a distal end 30 of the boom assembly 20, opposite the first end. In an embodiment, the tool 16 is the felling grapple 22 configured to grab objects such as tree limbs (for cutting) or telephone poles (for placing upright in a hole in the ground). FIGS. 4-6B depict exemplary grapples, as further described below.

The boom assembly 20 is mechanically coupled to the felling grapple 22 and configured to support the felling grapple 22. For extending the reach of the felling grapple 22, the boom assembly 20 may include more than one section. For example, proximal to the base 12 is a rotatable arm 32, followed by a lower member 34, middle member 36, and an upper member 38. The felling grapple 22 is located at the distal end 30 (with respect to the mobile base 12) of the boom assembly 20. The rotatable arm 32 is mechanically coupled to a rotatable shaft 40 mechanically coupled to the base 12. The lower member 34 may pivot from the end of the rotatable arm 32, and the upper member 38 may pivot from an upper end of the middle member 36.

Additionally members may extend from other members or members may be telescopic. For example, the middle member 36 may be, at least in part, disposed within the lower member 34, and capable of moving longitudinally within the lower member 34, to extend or retract by telescoping. The boom assembly 20 may include fewer or a greater number of sections, or members, without departing from the scope hereof.

In certain embodiments, the upper member 38 is electrically insulating to enable operation to nearby electrical power lines. An insulating proximal housing 42 may be formed of a non-conductive material, such as a polymer. The insulating proximal housing 42 may at least partially surround a pivoting base 48 of the felling grapple 22 adjacent to the upper member 38 of the boom assembly 20. The proximal housing 42 is insulating so as to prevent direct contact between the upper member 38 as well as the pivoting base 48 and the electrified source. The insulating proximal housing 42 may therefore provide secondary insulation in addition to the primary insulation provided by the insulated upper member 38. The secondary insulation also protects against the possibility of cross phasing. Cross phasing is current flow between two portions of a power system. Secondary insulation may also protect again current flow between power and ground.

In some embodiments, a secondary insulation segment is at least partially disposed between the proximal housing 42 of the pivoting base 48 and a distal housing of the pivoting base 48, discussed below. In these instances, the secondary insulation prevents a discharge through the insulating felling grapple 22. In still other embodiments, the secondary insulation segment is at least partially disposed between the felling grapple 22 and load.

Figure 3:
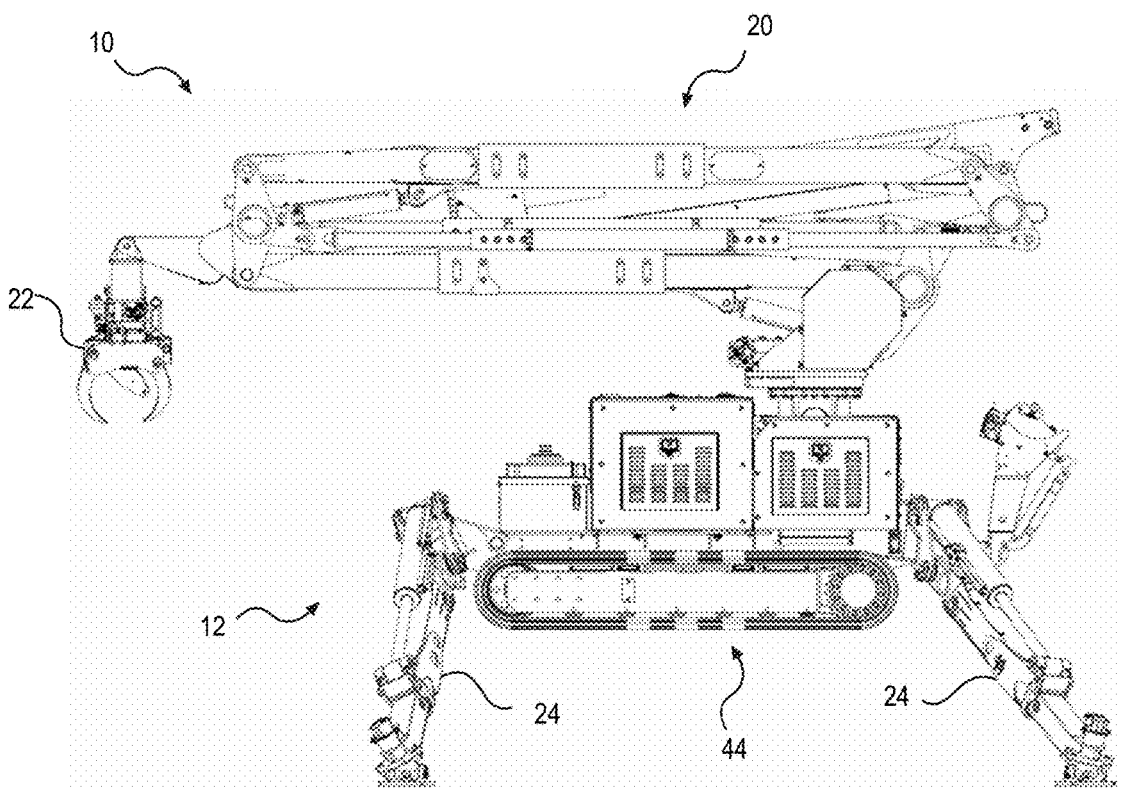
FIG. 3 depicts an alternative embodiment of the aerial device depicted in FIG. 1.
Figure 4:
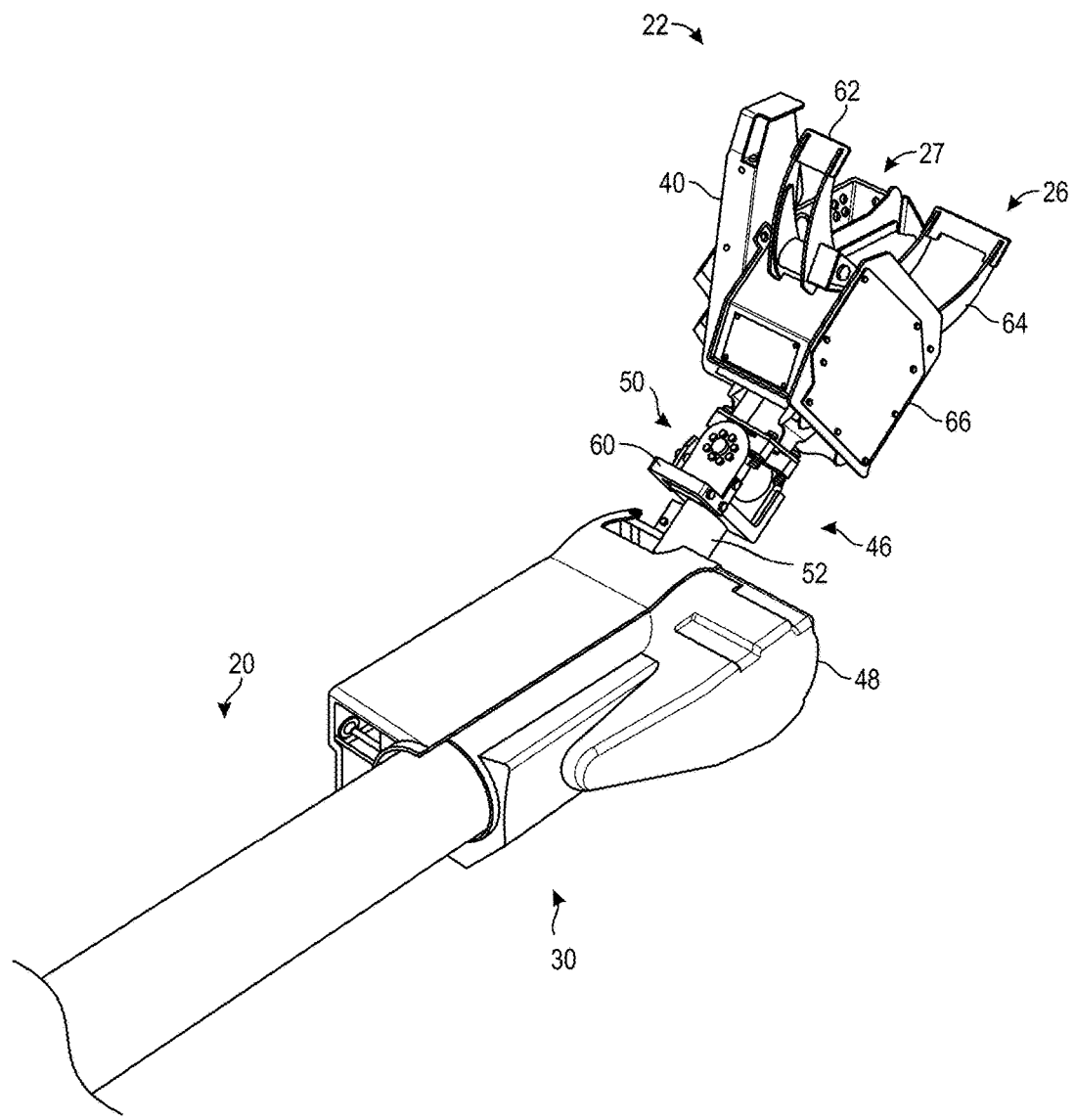
FIG. 4 depicts a closeup perspective views of the grapple for certain embodiments of the invention from a first side.
Figure 5:
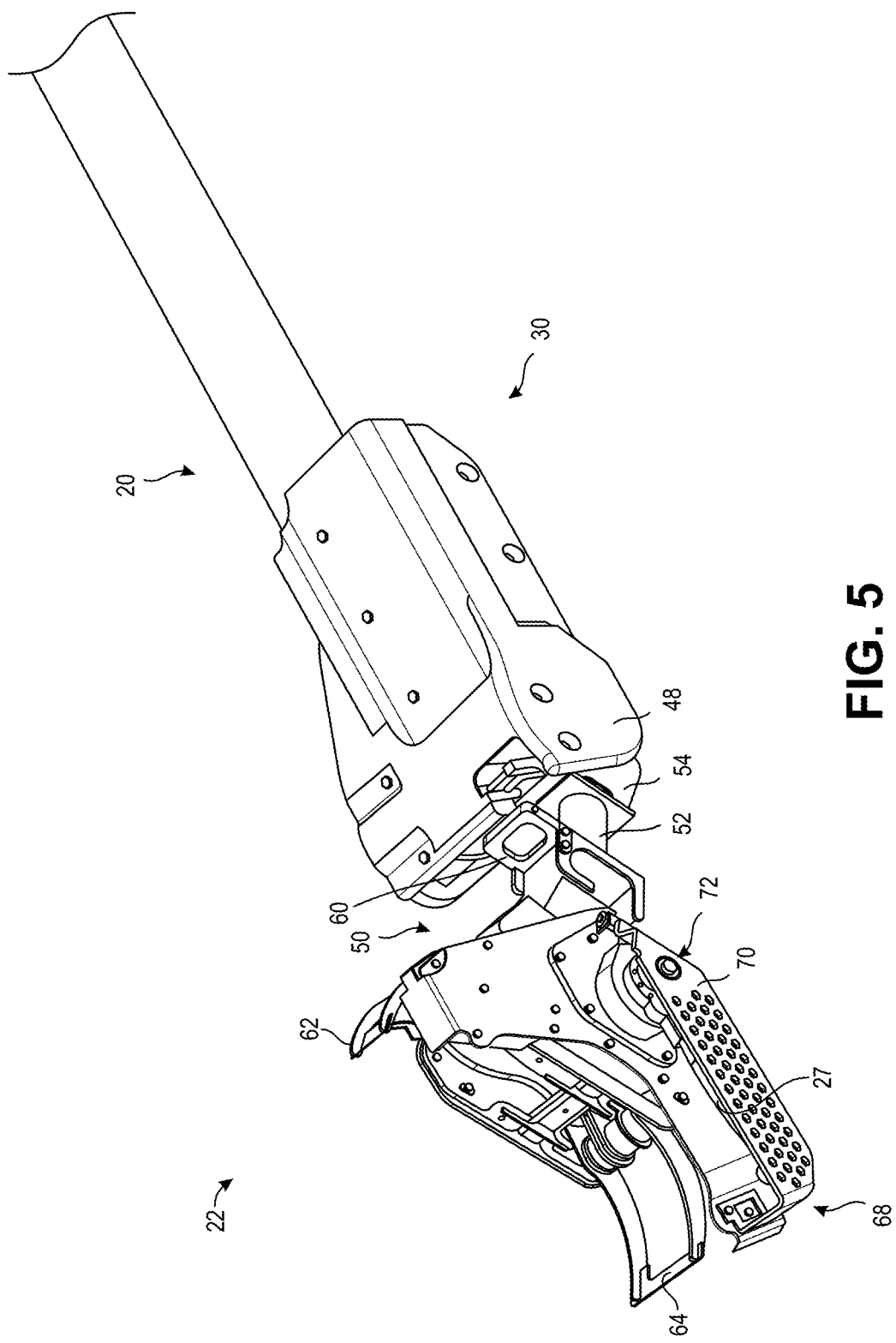
FIG. 5 depicts a second closeup perspective view of the grapple from a second side.

The boom assembly 20, depicted in an alternative embodiment in FIG. 3, may fold into a collapsed position which enables transporting via the base 12 as shown, or may extend as depicted in the exemplary embodiment presented in FIG. 3.

In some embodiments, the felling grapple 22 is configured for holding tree limbs while they are being cut. Operation of the felling grapple 22 may be by remote control for reducing the likelihood of an electrical discharge through the operator and to remove the operator from falling hazards. The felling grapple 22 may be equipped with, or used in conjunction with, a feller 27 such as, for example shears or a saw, such that the felling grapple 22 grips the tree limb to be cut, the cutting shears cut the limb, and the felling grapple 22 maintains its grip on the limb to lower it to the ground via the boom assembly 20. As the limb is cut, its weight is transferred from the tree to the felling grapple 22, and this load (e.g., the weight of the limb) is applied to the boom assembly 20 and in turn the base 12.

The felling grapple 22 may be placed in proximity to the object (e.g., a tree limb). Prior to extending the boom assembly 20, the base 12 may be moved to an appropriate location and stabilized. The boom assembly 20 may be rotated about the rotational shaft, and extended upwards and outwards away from the base 12 by pivoting the lower member 34, the middle member 36, the upper member 38, and by extending the middle member 36. Various combinations of these movements may be employed, together with rotating the felling grapple 22, to position the felling grapple 22 for gripping the object.

Figure 2:
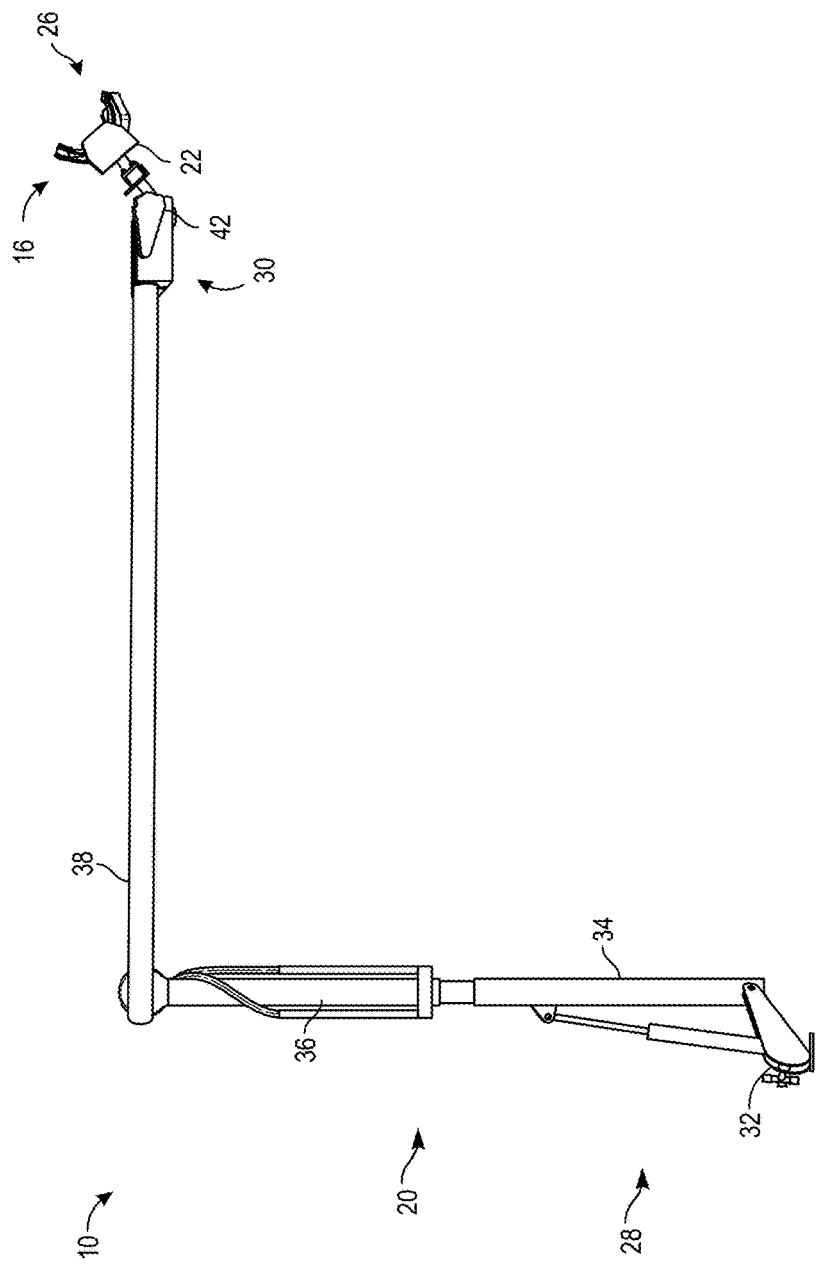
FIG. 2 depicts a perspective view of an embodiment of an insulating boom with a grapple.

FIG. 2 depicts an embodiment of the boom assembly 20 extended for use. The boom assembly 20 of FIG. 2 presents the boom assembly 20 and boom assembly components as described in FIG. 1. The boom assembly 20 may be extended such that the upper member 38 is rotatably extended from the middle member 36 and the lower member 34. Further, in some embodiments, the upper member 38 may telescopically extend from the middle member 36. The boom assembly 20, depicted in FIG. 2, in some embodiments, may be used together with the aerial device 10 depicted in FIG. 1 as described above.

FIG. 3 presents an embodiment of the aerial device 10 described above. In some embodiments, the base 12 may comprise a mobile track device 44 as shown, or be the utility truck 18, a crane base, an oilrig, an earth-working machine, railcar or a fixed structure. The outriggers 24 may be extendable, retractable, removable, and may be manually attached and extended or may be connected to the hydraulic or electrical system of the aerial device 10. The boom assembly 20 may be retractable and, in some embodiments, may fold as shown for storage and transport. The felling grapple 22 may also be removed for transport or may be secured at the end of the boom assembly 20. The aerial device 10 may be self-propelled with wheels or with tracks as shown or may be loaded onto a trailer and transported by a separate vehicle.

Turning now to an embodiment depicted in FIGS. 4-6A, the exemplary felling grapple 22 including the grapple 26 may be placed about the load (e.g., around a tree limb). The grapple 26 may spread apart to accommodate the tree limb, then close around the tree limb to grip it. The grapple 26 may lightly grip the tree limb without transferring any substantial weight to the felling grapple 22 or the grapple 26 may supply a necessary amount of pressure to hold the load in a desired position without otherwise breaking or damaging the load.

FIGS. 4-6A depict an embodiment of the invention presenting the felling grapple 22 attached to the boom assembly 20 via a positioning system 46 and a pivoting base 48. The positioning system 46 comprises a yaw actuator 50, a roll actuator 52, and a pitch actuator 54. Some or all of the pitch actuator 54 may be housed in the pivoting base 48 at the distal end 30 of the boom assembly 20.

In some embodiments, the pivoting base 48 may be covered by a housing (such as proximal housing 42 and/or other components) that is non-structural and designed to provide electrical and mechanical insulation. The pivoting base 48 may be designed to be resistant to impact and electrical current. The pivoting base housing may cover all boom tip components or may only partially cover some components. In some embodiments, the pivoting base housing may be non-structural and bend, deform, and deflect upon load, without failure to protect the enclosed components. The pivoting base 48 may house oil reservoirs and hose routings for the hydraulic system providing energy to the felling grapple 22, feller 27, and boom assembly 20. Further, the pivoting base 48 may house the pitch actuator 54.

In some embodiments, the felling grapple 22 is configured to pitch along a transverse axis relative to the upper member 38 of the boom assembly 20 provided by the positioning system 46 comprising the pitch actuator 54. The pitch actuator 54 may be a piston (not shown) connected to the boom assembly 20 and to the felling grapple 22. When the piston extends and contracts the felling grapple 22 pivots about the transvers axis creating a pitching motion. In some embodiments, the pitch actuator 54 may be a rotary actuator similar to the roll actuator 52 and yaw actuator 50 discussed below.

In some embodiments, the positioning system 46 comprises a roll actuator 52. The roll actuator 52 may be a rotary actuator and is attached to the pitch actuator 54 and may relay the pitching motion from the pitch actuator 54 to the felling grapple 22. In some embodiments, the roll actuator 52 is attached directly to the pitch actuator 54. The roll actuator 52 may rotate about a longitudinal axis substantially parallel to the boom assembly 20 distal end 30 and 90 degrees to the pitch actuator 54. The roll actuator 52 may provide 360 degrees of rotation to the felling grapple 22. The roll actuator 52 may also be insulated so as to provide the above-discussed secondary insulation against an electrical discharge.

In some embodiments, the positioning system 46 comprises a yaw actuator 50. The yaw actuator 50 may be a rotary actuator similar to the roll actuator 54 and may provide, for example, 180 degrees of rotation. The yaw actuator 50 may be attached to a u-frame 60 that attaches the yaw actuator 50 to the roll actuator 52. In some embodiments, the yaw actuator 50 may be directly attached to the felling grapple 22 and in some embodiments intermediate components may attach the yaw actuator 50 to the felling grapple 22. The yaw actuator 50 may provide rotation about an axis that may be 90 degrees to the roll actuator 52 axis of rotation and 90 degrees to the pitch actuator 54 axis of rotation. In some embodiments, the roll actuator 52, yaw actuator 50, and pitch actuator 54 may be in different arrangements such that for example, the yaw actuator 50 or the roll actuator 54 is attached directly to the boom assembly 20 and the roll actuator 52 or the pitch actuator 54 is attached to the felling grapple 22.

In some embodiments, as depicted in FIGS. 4-6B, the felling grapple 22 may comprise upper tines 62 and lower tines 64 for securing the load. Because the felling grapple 22 rotates, upper and lower are relative terms and used in reference to the figures and as such upper may be lower and lower upper spatially in some embodiments.

The felling grapple 22 may rotate, as described above, to any angle necessary to properly grip the load. For example, the load may be a fallen tree branch that rests on power lines. In order to grip the load, the felling grapple 22 may rotate by pitch, roll, and yaw to align with the branch, and remain out of the way of the power lines. This may ensure that only the branch is contacted by the felling grapple 22 and the felling grapple 22 remains a minimum desired distance from the power lines.

The felling grapple 22 may include a distal housing 66 that protects interior components from damage from loose tree limbs and electricity. The distal housing 66 may be any durable material that may be rated and tested to withstand loads similar to those used in tree trimming such as branches falling, moving the boom such that the felling grapple 22 impacts a tree or structure or any other possible error that may cause damage to the interior components. Further, the distal housing 66 may be electrically insulating using polymer as described above. In some embodiments, the felling grapple 22 distal housing 66 comprises the same or similar material to the pivoting base 48. In this way, the distal housing 66 provides secondary insulation from the electrified source, in addition to the primary insulation provided by the upper member 38 of the boom assembly 20.

In some embodiments, the upper tines 62 and lower tines 64, when separated, present a general Y-shape. Similarly, the feller housing 68 presents a Y-shape. The Y-shape aids in aligning the felling grapple 22 with the load such as, for example, a limb. As the felling grapple 22 move towards the limb, the Y-shaped feller housing 68 contacts the limb directing the limb to the vertex of the Y-shape. This configuration provides a location for cutting the limb. Once the limb is secured in the vertex the feller 27 may be used to cut the limb. Further, when free cutting, the feller 27 may cut limbs while using the Y-shaped feller housing 68 as a backing.

The feller housing 68 may also be connected to a guard 70. The guard 70 may provide a housing to prevent damage to the feller 27 or components for operating the feller 27. The guard 70 may also provide protection for any workers that may be working in close proximity to the felling grapple 22.

Figure 6A:
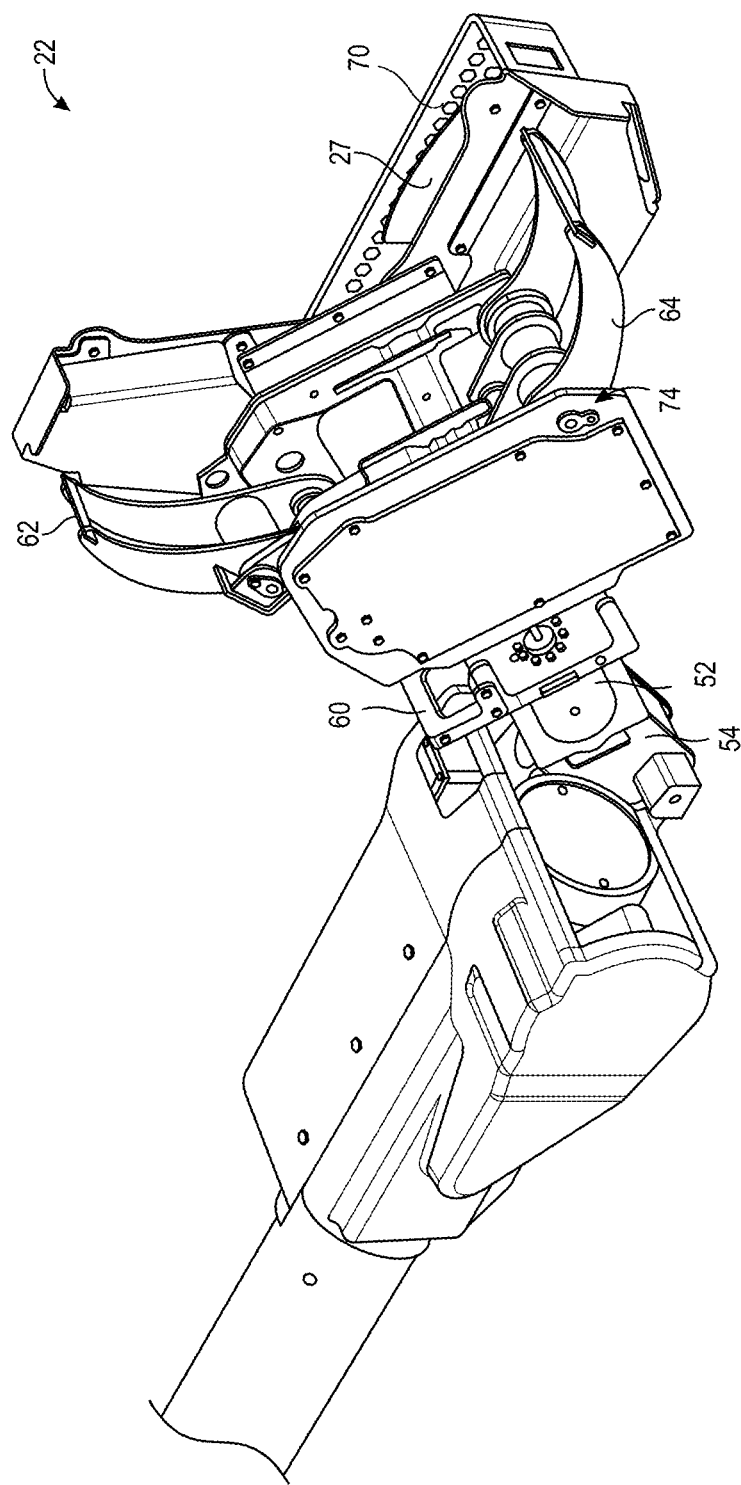
FIG. 6A depicts a third closeup perspective view of the grapple from a third side.
Figure 6B:
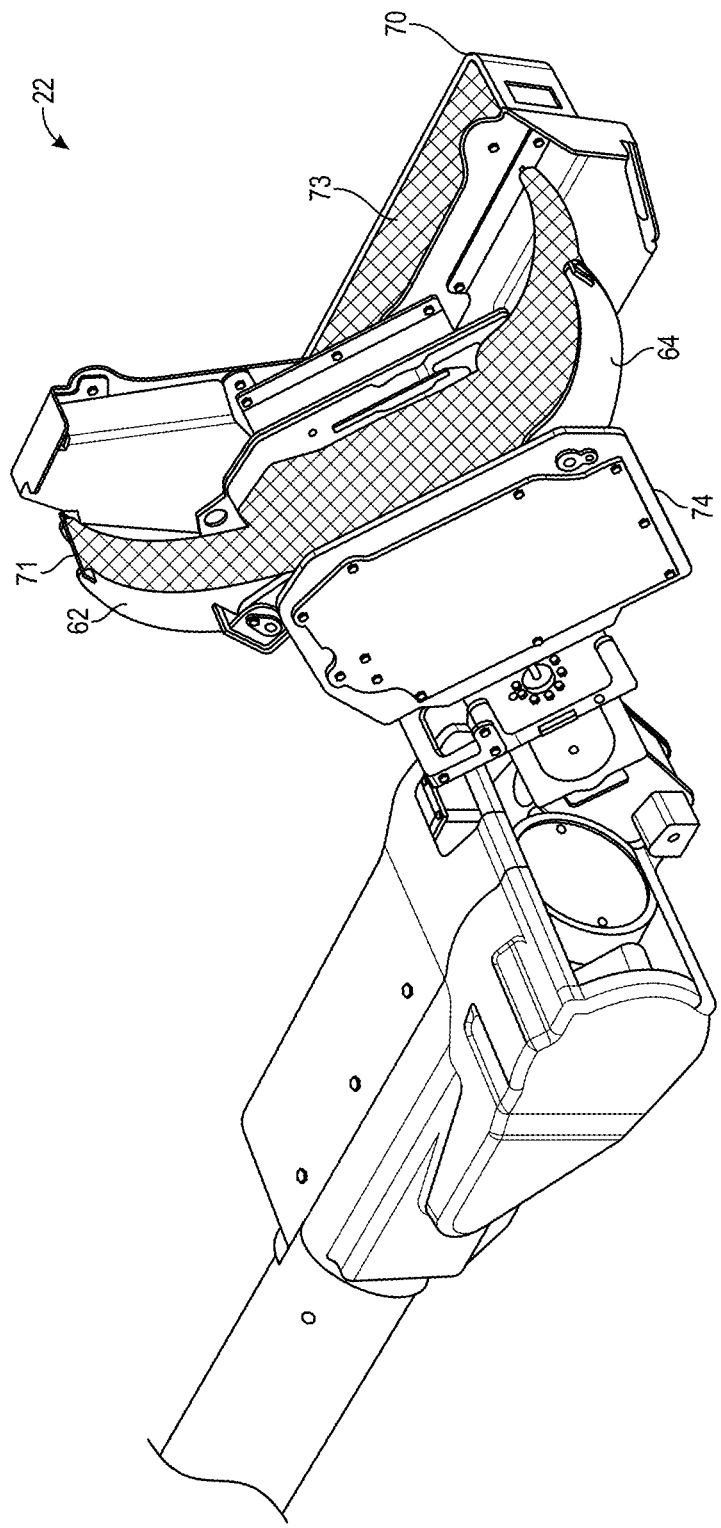
FIG. 6B depicts the view of FIG. 6A with a secondary insulation schematically added to reduce contact between the grapple and the electrified source.

Turning to FIG. 6B, an embodiment of the invention is shown in which secondary insulation is provided on the upper tines 62 and the lower tines 64. In these embodiments, a tine cover 71 is formed of a polymer and emplaced over one or more tines 62,64. The tine cover 71 prevents the tines 62,64, which may be formed of metal, from directly contacting the energized vegetation material. This may prevent or reduce the likelihood and/or severity of an electrical discharge through the felling grapple 22. The tine cover 71 may also bridge between the upper tines 62 and the lower tines 64 so as to cover the intermediate sections of the pivoting base 48. The secondary insulation may also comprise a feller cover 73 formed of a polymer and configured to cover the guard 70 so as to prevent direct contact between the energized vegetation material and the feller 27. The feller cover 73 may be configured to move or be pushed away during the operation of the feller 27 such that the feller cover 73 is not struck by the severing feller (e.g., by the running chainsaw).

In some embodiments, the upper tines 62 and the lower tines 64 open and close together with one action. This action, and force, may be relayed to the grapple 26 from a single hydraulic grapple cylinder (not shown). The operation of one grapple cylinder for both the upper tines 62 and lower tines 64 ensures that the upper tines 62 and lower tines 64 work together substantially simultaneously and reduces the weight of the system attached to the boom assembly 20 by only using one cylinder. Typically, each set of tines 62,64 is operated by a designated cylinder thus have a cylinder per set of tines 62,64. Therefore, in typical grappling systems, the upper tines 62 would have a designated cylinder and the lower tines 64 would have a designated cylinder. Therefore, typically, the felling grapple 22 would have two cylinders. The felling grapple 22 presented in embodiments herein, has a weight advantage over typical grapples since only one cylinder is necessary.

The felling grapple 22 may clamp the load between the upper tines 62 and the lower tines 64. The upper tines 62 may rotate about an upper linking element 72 and the lower tines 64 may rotate about a lower linking element 74 causing the tines 62,64 to rotate together clamping and securing the load. In some embodiments, the upper linking element 72 and the lower linking element 74 may be pins as depicted in FIGS. 4-6A The tines 62,64 may rotate about the linking elements applying pressure to the load for gripping and securing the load between the tines 62,64. The pressure applied to the load may be proportional to the pressure in a hydraulic system providing energy to the tines 62,64. The pressure applied to the load may also be controlled manually by the operator or automatically be a control system.

Generally, the hydraulic system includes a motor, valves, manual controls, and hydraulic lines, and, in some embodiments, is connected to an electrical system for controlling portions of the hydraulic system. The hydraulic fluid may be any mineral oils, fire resistant fluids, water-based fluids, or any fluid that may be used for hydraulic purposes. The hydraulic fluid may be pumped from a pump at the base or any hydraulic motor or tool that may couple to the hydraulic system at any access point that may be on the aerial device 10. In some embodiments presented herein, the felling grapple 22 and feller 27 connect to the hydraulic system via couplers (not shown) at the distal end of the boom assembly 20. The hydraulic fluid may be provided to the felling grapple 22 via hydraulic lines and the fluid may be controlled via control valves. In some embodiments, the hydraulic fluid may be controlled by valves that are electrically controlled by an automatic control system, an electrical interface, manually, or via remote control.

The controller is for example a computer, microcontroller, microprocessor, or programmable logic controller (PLC) having a memory, including a non-transitory medium for storing software, and a processor for executing instructions of the software. The controller may further include an optional interface (depicted with dashed lines in FIG. 1 to indicate that it is optional) for the user to transmit instructions and receive information. The interface may enable a user to input instructions to the device or to receive an alert or indication from the sensor suite. Communication between controller, device, and sensor suite may be by one of a wired and/or wireless communication media. The controller is not limited by the materials from which it is formed or the processing mechanisms employed therein and, as such, may be implemented via semiconductor(s) and/or transistors (e.g., electronic integrated circuits (ICs)), and so forth. It should also be appreciated that the discussed functions and methods performed by the controller may be performed by other processors.

In various embodiments, the controller will be sampling, receiving, or otherwise acquiring load indications occasionally, periodically, continuously, or substantially continuously. Additionally or alternatively, the controller may be sampling, receiving, or otherwise acquiring the load indication only upon the presence of certain conditions. For example, the system 700 may not report load indications while idle.

Figure 7:
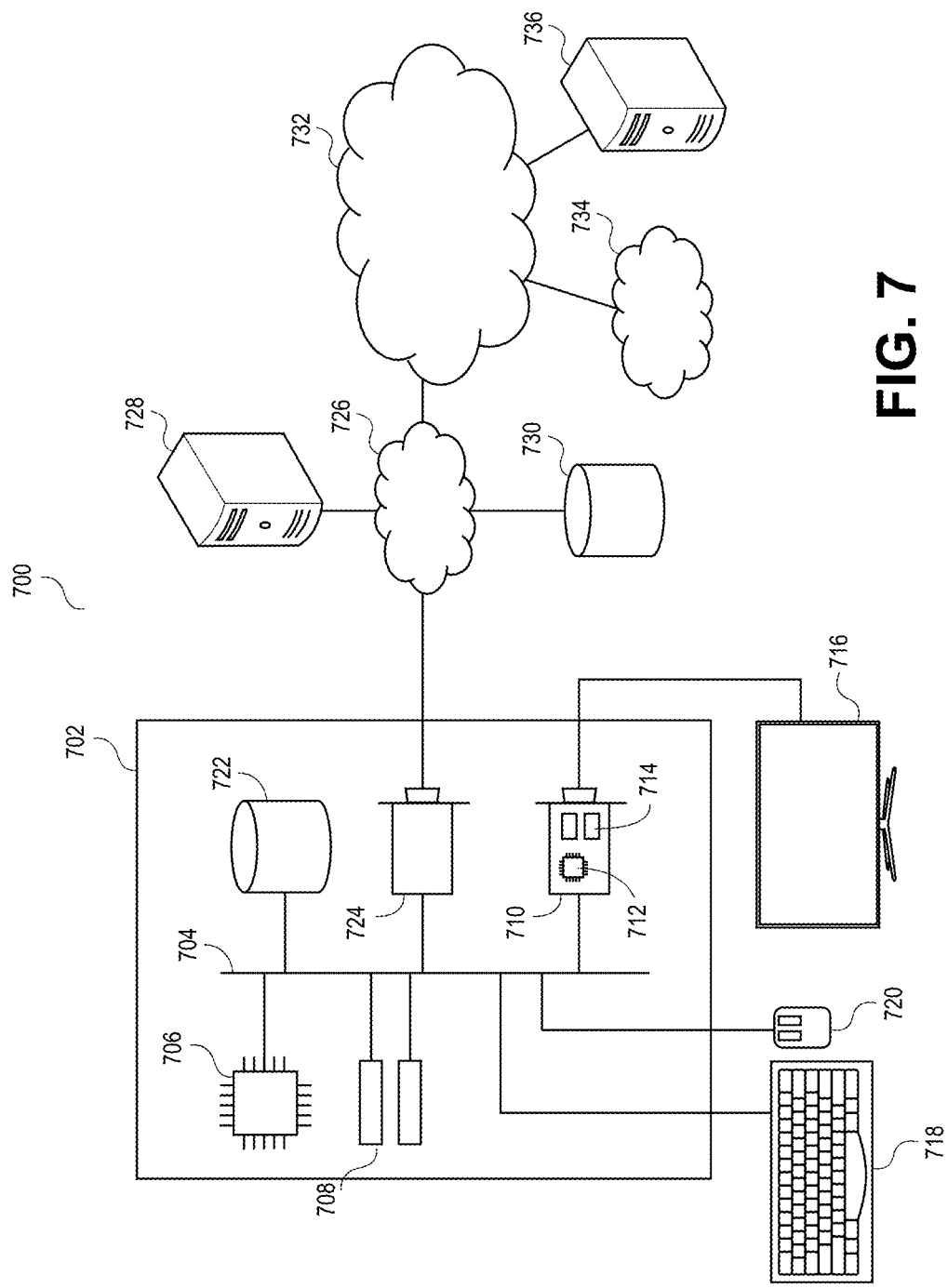
FIG. 7 depicts a control system for implementing embodiments of the invention.
Figure 8:
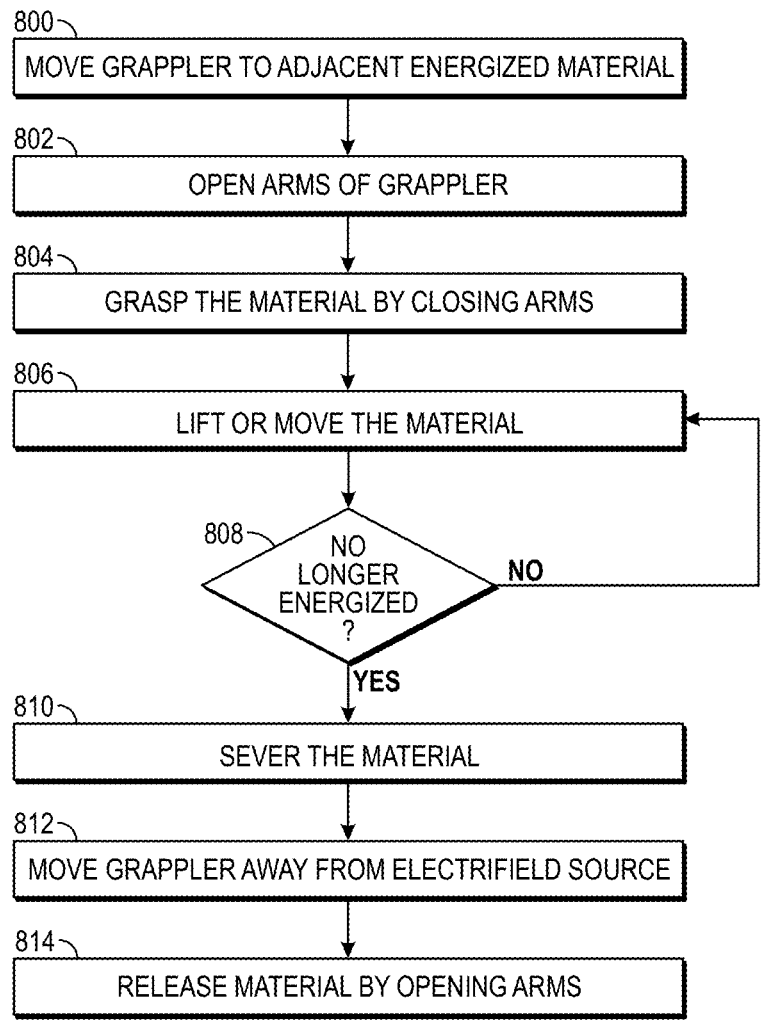
FIG. 8 depicts a flow chart presenting a method of removing electrified material.

Turning to FIG. 7, the physical hardware that makes up the system will now be discussed. The system 700 comprising an exemplary hardware platform that can form one element of certain embodiments of the invention is depicted. Computer 702 can be a desktop computer, a laptop computer, a server computer, a mobile device such as a smartphone or tablet, or any other form factor of general- or special-purpose computing device. Depicted with computer 702 are several components, for illustrative purposes. In some embodiments, certain components may be arranged differently or absent. Additional components may also be present. Included in computer 702 is system bus 704, whereby other components of computer 702 can communicate with each other. In certain embodiments, there may be multiple busses or components may communicate with each other directly. Connected to system bus 704 is central processing unit (CPU) 706. Also attached to system bus 704 are one or more random-access memory (RAM) modules 708.

Also attached to system bus 704 is graphics card 710. In some embodiments, graphics card 704 may not be a physically separate card, but rather may be integrated into the motherboard or the CPU 706. In some embodiments, graphics card 710 has a separate graphics-processing unit (GPU) 712, which can be used for graphics processing or for general purpose computing (GPGPU). Also on graphics card 710 is GPU memory 714. Connected (directly or indirectly) to graphics card 710 is display 716 for user interaction. In some embodiments no display is present, while in others it is integrated into computer 702. Similarly, peripherals such as keyboard 718 and mouse 720 are connected to system bus 704. Like display 716, these peripherals may be integrated into computer 702 or absent. Also connected to system bus 704 is local storage 722, which may be any form of computer-readable media, and may be internally installed in computer 702 or externally and removably attached.

Finally, network interface card (NIC) 724 is also attached to system bus 704 and allows computer 702 to communicate over a network such as network 726. NIC 724 can be any form of network interface known in the art, such as Ethernet, ATM, fiber, Bluetooth, or Wi-Fi (i.e., the IEEE 802.11 family of standards). NIC 724 connects computer 702 to local network 726, which may also include one or more other computers, such as computer 728, and network storage, such as data store 730. Local network 726 is in turn connected to Internet 732, which connects many networks such as local network 726, remote network 734 or directly attached computers such as computer 736. In some embodiments, computer 702 can itself be directly connected to Internet 732.

The computer program of embodiments of the invention comprises a plurality of code segments executable by the computing device for performing the steps of various methods of the invention. The steps of the method may be performed in the order discussed, or they may be performed in a different order, unless otherwise expressly stated. Furthermore, some steps may be performed concurrently as opposed to sequentially. Also, some steps may be optional. The computer program may also execute additional steps not described herein. The computer program, system, and method of embodiments of the invention may be implemented in hardware, software, firmware, or combinations thereof using the system, which broadly comprises server devices, computing devices, and a communication network.

The computer program of embodiments of the invention may be responsive to user input. As defined herein user input may be received from a variety of computing devices including but not limited to the following: desktops, laptops, calculators, telephones, smartphones, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with at least one processing element and at least one memory element. The processing element may implement operating systems, and may be capable of executing the computer program, which is also generally known as instructions, commands, software code, executables, applications ("apps"), and the like. The at least one processing element may comprise processors, microprocessors, microcontrollers, field programmable gate arrays, and the like, or combinations thereof. The at least one memory element may be capable of storing or retaining the computer program and may also store data, typically binary data, including text, databases, graphics, audio, video, combinations thereof, and the like. The at least one memory element may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to the at least one memory element, the server devices may further include file stores comprising a plurality of hard disk drives, network attached storage, or a separate storage network.

The computing devices may specifically include mobile communication devices (including wireless devices), workstations, desktop computers, laptop computers, palmtop computers, tablet computers, portable digital assistants (PDA), smart phones, smart watches, wearable technology, and the like, or combinations thereof. Various embodiments of the computing device may also include voice communication devices, such as cell phones and/or smart phones. In preferred embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the system.

The communication network may be wired or wireless and may include servers, routers, switches, wireless receivers and transmitters, and the like, as well as electrically conductive cables or optical cables. The communication network may also include local, metro, or wide area networks, as well as the Internet, or other cloud networks. Furthermore, the communication network may include cellular or mobile phone networks, as well as landline phone networks, public switched telephone networks, fiber optic networks, or the like.

Embodiments of the invention directed to the computer program may perform any or all of the above-discussed steps. The computer program may run on computing devices or, alternatively, may run on one or more server devices. In certain embodiments of the invention, the computer program may be embodied in a stand-alone computer program (i.e., an "app") downloaded on a user's computing device or in a web-accessible program that is accessible by the user's computing device via the communication network. As used herein, the stand-along computer program or web-accessible program provides users with access to an electronic resource from which the users can interact with various embodiments of the invention.

While the method steps performed by the user and/or the controller have been discussed throughout, the method will be discussed below for clarity. One exemplary method is a method of removing energized vegetation material. The vegetation material is energized based at least in part upon physical contact with an electrified source, such as a power line, transformer, or other electrical equipment. The vegetation material may be damaging the electrified source or causing a hazard to surrounding people and things. Instead of the prior art method of cutting electrical power to the electrified source, in embodiments of the invention, the method will allow the utility worker to remove the energized vegetation material while the electrified source remains electrified.

In Step 800, the user moves the felling grapple 22 to a position adjacent to the energized vegetation material. The user may move the boom assembly 20 and/or the felling grapple 22 in performing this task. Typically, by a combination of movements of the boom assembly 20 and the felling grapple 22, the user will move the felling grapple 22 to the position adjacent. The position adjacent to the energized material is such that the tines 62,64 may grasp the energized material by rotating relative to the pivoting base 48. In most instances, the user will grasp the largest central trunk of the branch. In this way, when the branch is severed, the user will have control over vegetation material such that it may be moved (as discussed below).

The user may perform this, and other steps, by manipulating controls, such as a remote control. The remote control may, for example, allow the user to stand away from the utility vehicle, such that any electrical discharge will not affect the utility worker. The remote control may also, as another example, allow the utility worker to stand in a location such that the utility worker can optimize their view of the work site and move when necessary.

In Step 802, the utility worker opens the tines 62,64. The utility worker performs this step by manipulating controls so the tines 62,64 of the grappler 26 pivot away from the other. This presents a void between the two tines 62,64 into which the energized vegetation material is disposed. In some instances, this step is performed before or simultaneously with Step 800. This step may also include moving the felling grapple 22 closer to or into contact with the energized vegetation material.

In Step 804, the utility worker grasps the energized vegetation material by closing the tines 62,64. Closing the tines 62,64 is performed by the inverse of Step 802, namely by pivoting each of the tines 62,64 to pivot toward the other. The tines 62,64 also excerpt a clamping force on the energized vegetation material. The clamping force holds the energized vegetation material against the pivoting base 48 of the insulating felling grapple 22 such that the insulating felling grapple 22 can move the energized vegetation material and support the energized vegetation material during and after severing. The amount of the clamping force that is used, including thresholds and interlocks related thereto, are discussed in the concurrently filed patent application discussed above and hereby incorporated by reference in its entirety In Step 806, the utility worker lifts or otherwise moves the energized vegetation material out of contact with the electrified source. The utility worker physically moves the vegetation out of contact so as to end or reduce the voltage of the energized vegetation material. The movement of the vegetation material out of contact eliminates or reduces the potential energy flow into the vegetation material. This step may serve one or more purposes. For example, this step may eliminate the electrified vegetation material contacting the feller, so as to lessen the likelihood or severity of an electrical discharge through the feller. As another example, this step may lower the likelihood that the electrified source (such as a power line) is severed by the feller, thereby reducing other property damage and other electrical discharges.

This step may be performed by either movement of the felling grapple 22, movement of the boom assembly 20, or both. This step, like the others described herein, may be performed by the user with a remote control, by the user with a set of lower boom controls, or automatically by the controller. In some instances, the movement of the energized vegetation material may break the vegetation material free, such that none of the below-discussed severing is necessary.

In Step 808, the utility worker determines that the energized vegetation material is no longer electrified. In some instances, this is performed visually (e.g., by the utility worker observing the vegetation material being no longer in contact). In some instances, this is performed electronically based upon sensors. An example sensor that could be used is the phased unit detection system described in previously filed U.S. patent application Ser. No. 16/053,219. The phased unit detection system can determine whether a certain component is in contact with an electrified source despite no current flow. It should be appreciated that in many instances, the vegetation material will have some incidental contact with leaves or other debris during and after movement. Since the wood of the branch is the best conductor, the vegetation material may still be out of contact with the electrified source even if some portion of the vegetation material is still in contact.

In Step 810, the utility worker severs the non-electrified vegetation material. Once the vegetation material is no longer in contact with the electrified source (through visual and/or sensor detection), the severing of the vegetation material can begin. The severing utilizes the feller as described above. The feller may sever by cutting, sawing, pinching, or other severing method. The vegetation material is severed such that it will not return to contact with the electrified source upon release by the grapple.

In Step 812, the utility worker moves the insulated felling grapple 22 further away from the electrified source. Based upon the vegetation material no longer being secured to the rest of the tree (or whatever other structure from which it was severed), the grapple may further move the vegetation material. The grappler 26 retains the grasp upon the vegetation material after severing, such that it may be further moved. This movement of the insulating felling grapple 22 may include a movement of the grapple directly and/or movement of the boom assembly 20.

In Step 814, the utility worker releases the vegetation material by manipulating the control to moving the tines 62,64 of the grappler 26 apart. This allows the vegetation material to fall or rest in a discard location. The discard location may be on the ground, in the bed of the utility vehicle or a trailer (not illustrated), or other location. Following this step, the utility worker may repeat the process to remove other energized vegetation or perform other such tasks.

It should be noted that the above method refers to energized vegetation material but the method may be used on any of numerous types of energized materials. Some material, such a part of a structure, may become energized by falling into contact with the electrified source. The above steps may be similarly used to remove these other energized materials.

Although embodiments of this disclosure have been described with reference to the illustrations in the attached drawing figures, it is noted that equivalents may be employed and substitutions made herein without departing from the scope hereof as recited in the claims.

Having thus described various embodiments, what is claimed as new and desired to be protected by Letters Patent includes the following:

1. A utility vehicle for removing energized material, comprising:
   a boom assembly including a primary insulation segment; and
   a felling grapple including a secondary insulation segment,
   said insulated felling grapple comprising—
      a pivoting base;
      a grapple secured to the pivoting base,
      wherein the grapple includes an arm for gripping the energized material;
      a feller secured to the pivoting base and configured to sever the energized material,
      wherein the felling grapple retains the energized material after severed by the feller such that the energized material may be manipulated;
      a proximal housing at least partially surrounding the pivoting base adjacent to the boom assembly,
      wherein the proximal housing is insulating; and
      a distal housing at least partially surrounding the pivoting base adjacent to at least one of the feller and the grapple,
      wherein the distal housing is insulating.

2. The utility vehicle of claim 1, wherein the feller includes:
   a chainsaw pivotably connected to the pivoting base; and
   a protective cage at least partially surrounding the chainsaw.

3. The utility vehicle of claim 1, further comprising:
   a remote control such that the user may operate the boom assembly and the felling grapple remotely.

4. The utility vehicle of claim 1,
   wherein the primary insulation segment is an insulating upper boom section of the boom assembly,
   wherein the primary insulation prevents a discharge of electricity from the felling grapple to the ground.

5. The utility vehicle of claim 1,
   wherein the secondary insulation segment is disposed between a proximal housing of the pivoting base and a distal housing of the pivoting base,
   wherein the secondary insulation prevents a discharge through the insulating felling grapple.

6. The utility vehicle of claim 1, wherein the secondary insulation segment includes—
   an insulating arm cover over said arm for gripping the energized material,
   said insulating arm cover is configured to provide insulation between the energized material and the arm.

7. The utility vehicle of claim 6, wherein the secondary insulation segment further includes—
   an insulating feller cover over said feller configured to provide insulation between the energized material and the feller before the feller severs,
   wherein the insulating feller cover is configured to be automatically removed such that the feller may sever the energized material.

8. A method for removing vegetation material that is energized by contact with an electrified source comprising:
   manipulating an insulating boom assembly so as to move a felling grapple adjacent to the energized vegetation material;
   grasping the energized vegetation material by operating at least one arm of the felling grapple;
   moving the energized vegetation material out of contact with the electrified source, such that the vegetation material becomes non-energized;
   receiving an indication from a controller that the energized vegetation material is no longer energized;
   severing the non-energized vegetation material by operating a feller of the felling grapple; and
   moving the severed and non-energized vegetation material to a discard location by manipulating at least one of the insulating boom assembly and the felling grapple.

9. The method of claim 8, wherein the steps are performed via a dielectrically isolated remote control.

10. The method of claim 8, wherein the step of operating the feller includes activating a chainsaw and pivoting the chainsaw so as to contact the non-energized material.

11. The method of claim 8, wherein the electrified source is a power line.

12. A utility vehicle for removing energized material, comprising:
   a boom assembly including a primary insulation segment; and
   a felling grapple including a secondary insulation segment,
   said insulated felling grapple comprising—
      a pivoting base;
      a grapple secured to the pivoting base,
      wherein the grapple includes an arm for gripping the energized material;
      an insulating arm cover over said arm for gripping the energized material,
      wherein said insulating arm cover is configured to provide insulation between the energized material and the arm;
      a feller secured to the pivoting base and configured to sever the energized material, wherein the felling grapple retains the energized material after severed by the feller such that the energized material may be manipulated.

13. The utility vehicle of claim 12, wherein the feller includes:
  a chainsaw pivotably connected to the pivoting base; and
  a protective cage at least partially surrounding the chainsaw.

14. The utility vehicle of claim 12, further comprising:
  a remote control such that the user may operate the boom assembly and the felling grapple remotely.

15. The utility vehicle of claim 12,
  wherein the primary insulation segment is an insulating upper boom section of the boom assembly,
  wherein the primary insulation prevents a discharge of electricity from the felling grapple to the ground.

16. The utility vehicle of claim 12, wherein the felling grapple further comprises:
  a proximal housing at least partially surrounding the pivoting base adjacent to the boom assembly,
  wherein the proximal housing is insulating; and
  a distal housing at least partially surrounding the pivoting base adjacent to at least one of the feller and the grapple,
  wherein the distal housing is insulating.

17. The utility vehicle of claim 16,
  wherein the secondary insulation segment is disposed between a proximal housing of the pivoting base and a distal housing of the pivoting base,
  wherein the secondary insulation prevents a discharge through the insulating felling grapple.

18. The utility vehicle of claim 12, wherein the secondary insulation segment further includes—
  an insulating feller cover over said feller configured to provide insulation between the energized material and the feller before the feller severs,
  wherein the insulating feller cover is configured to be automatically removed such that the feller may sever the energized material.

* * * * *